(12) United States Patent
Garcowski et al.

(10) Patent No.: US 7,549,116 B1
(45) Date of Patent: Jun. 16, 2009

(54) COMPUTER PROGRAM PRODUCT FOR DISPLAYING MULTIPLE ROW LAYOUTS IN A TABLE

(75) Inventors: Jason Chester Garcowski, Raleigh, NC (US); Steven Brent Koonce, Durham, NC (US); Dong Lieu, Raleigh, NC (US); Brandon David Tweed, North Aurora, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/060,189

(22) Filed: Mar. 31, 2008

(51) Int. Cl.
G06N 3/00 (2006.01)
(52) U.S. Cl. .................................................. 715/212
(58) Field of Classification Search ................. 715/212, 715/234, 243, 254, 716, 719; 725/37, 56, 725/57
See application file for complete search history.

(56) References Cited

U.S. PATENT DOCUMENTS

| | | | | |
|---|---|---|---|---|
| 5,613,131 | A | 3/1997 | Moss et al. | 395/765 |
| 6,639,611 | B1 | 10/2003 | Leduc | 345/764 |
| 6,981,209 | B1* | 12/2005 | Parikh et al. | 715/212 |
| 7,065,704 | B1 | 6/2006 | Xu | 715/509 |
| 7,155,658 | B2 | 12/2006 | Huffman et al. | 714/776 |
| 7,328,400 | B2 | 2/2008 | Van Patten Benhase et al. | 715/501.1 |
| 7,366,978 | B1* | 4/2008 | Jones et al. | 715/209 |
| 2002/0147725 | A1* | 10/2002 | Janssen et al. | 707/100 |
| 2006/0259524 | A1* | 11/2006 | Horton | 707/201 |
| 2007/0005630 | A1* | 1/2007 | Selca et al. | 707/102 |
| 2007/0136655 | A1 | 6/2007 | Peters | 715/509 |
| 2007/0180417 | A1* | 8/2007 | Eischeid | 716/8 |
| 2007/0198301 | A1* | 8/2007 | Ayers et al. | 705/3 |

FOREIGN PATENT DOCUMENTS

WO  WO 2007/091259  8/2007

OTHER PUBLICATIONS

Anderson, Richard J., et al., "The Table Layout Problem," SCG '99, Miami Beach, FL, Jun. 1999, pp. 115-123 [ACM 1-58113-068-6/99/06].*
Dodge, Mark, et al. "Microsoft(r) Office Excel(r) 2007 Inside Out," Jan. 2007, Microsoft Press.*

* cited by examiner

Primary Examiner—William L Bashore
Assistant Examiner—Kyle R Stork
(74) Attorney, Agent, or Firm—Zilka-Kotab, PC

(57) ABSTRACT

A computer program product comprising a computer useable medium includes a computer readable program, wherein the computer readable program when executed on a computer causes the computer to display a data set as a table including a plurality of cells. Additionally, the computer readable program when executed on a computer causes the computer to assign a column width to each cell in a row of the table, independently of other table rows having differing layouts, such that the table is capable of displaying a plurality of different row layouts simultaneously. The computer readable program when executed on a computer causes the computer to display a dynamic header configured to display a row layout of a selected row of the table. Further, the computer readable program when executed on a computer causes the computer to increase a readability of the dynamic header with respect to the selected row by various mechanisms.

1 Claim, 3 Drawing Sheets

| $C_{11}$ | | | $C_{12}$ | | | $C_{13}$ | | | |
|---|---|---|---|---|---|---|---|---|---|
| THIS IS | | | ROW 1 | | | FIELD LAYOUT 1 | | | |
| THIS | IS | ROW | 2 | | | FIELD | LAYOUT | 2 | |
| THIS | IS | ROW | 3 | | | FIELD | LAYOUT | 3 | |
| THIS | IS | ROW | 4 | | | FIELD | LAYOUT | 2 | |
| THIS IS | | | ROW 5 | | | FIELD LAYOUT 1 | | | |
| THIS | IS | ROW | 6 | | | FIELD | LAYOUT | 3 | |
| THIS | IS | ROW | 7 | | | FIELD | LAYOUT | 3 | |
| THIS | IS | ROW | 8 | | | FIELD | LAYOUT | 2 | |
| THIS IS | | | ROW 9 | | | FIELD LAYOUT 1 | | | |
| THIS IS | | | ROW 10 | | | FIELD LAYOUT 1 | | | |
| THIS | IS | ROW | 11 | | | FIELD | LAYOUT | 3 | |
| THIS | IS | ROW | 12 | | | FIELD | LAYOUT | 2 | |
| THIS | IS | ROW | 13 | | | FIELD | LAYOUT | 3 | |
| THIS | IS | ROW | 14 | | | FIELD | LAYOUT | 3 | |

FIGURE 2A

| $C_{21}$ | $C_{22}$ | $C_{23}$ | $C_{24}$ | $C_{25}$ | $C_{26}$ | $C_{27}$ | $C_{28}$ | $C_{29}$ | $C_{210}$ |
|---|---|---|---|---|---|---|---|---|---|
| THIS IS | | | ROW 1 | | | FIELD LAYOUT 1 | | | |
| THIS | IS | ROW | 2 | | | FIELD | LAYOUT | 2 | |
| THIS | IS | ROW | 3 | | | FIELD | LAYOUT | 3 | |
| THIS | IS | ROW | 4 | | | FIELD | LAYOUT | 2 | |
| THIS IS | | | ROW 5 | | | FIELD LAYOUT 1 | | | |
| THIS | IS | ROW | 6 | | | FIELD | LAYOUT | 3 | |
| THIS | IS | ROW | 7 | | | FIELD | LAYOUT | 3 | |
| THIS | IS | ROW | 8 | | | FIELD | LAYOUT | 2 | |
| THIS IS | | | ROW 9 | | | FIELD LAYOUT 1 | | | |
| THIS IS | | | ROW 10 | | | FIELD LAYOUT 1 | | | |
| THIS | IS | ROW | 11 | | | FIELD | LAYOUT | 3 | |
| THIS | IS | ROW | 12 | | | FIELD | LAYOUT | 2 | |
| THIS | IS | ROW | 13 | | | FIELD | LAYOUT | 3 | |
| THIS | IS | ROW | 14 | | | FIELD | LAYOUT | 3 | |

FIGURE 2B

| $C_{21}$ | $C_{22}$ | $C_{23}$ | $C_{24}$ | $C_{25}$ | $C_{26}$ | $C_{27}$ | $C_{28}$ | $C_{29}$ | $C_{210}$ |
|---|---|---|---|---|---|---|---|---|---|
| THIS IS | | | ROW 1 | | | FIELD LAYOUT 1 | | | |
| THIS | IS | ROW | 2 | | | FIELD | LAYOUT | 2 | |
| THIS | IS | ROW | 3 | | | FIELD | LAYOUT | 3 | |
| THIS | IS | ROW | 4 | | | FIELD | LAYOUT | 2 | |
| THIS IS | | | ROW 5 | | | FIELD LAYOUT 1 | | | |
| THIS | IS | ROW | 6 | | | FIELD | LAYOUT | 3 | |
| THIS | IS | ROW | 7 | | | FIELD | LAYOUT | 3 | |
| THIS | IS | ROW | 8 | | | FIELD | LAYOUT | 2 | |
| THIS IS | | | ROW 9 | | | FIELD LAYOUT 1 | | | |
| THIS IS | | | ROW 10 | | | FIELD LAYOUT 1 | | | |
| THIS | IS | ROW | 11 | | | FIELD | LAYOUT | 3 | |
| THIS | IS | ROW | 12 | | | FIELD | LAYOUT | 2 | |
| THIS | IS | ROW | 13 | | | FIELD | LAYOUT | 3 | |
| THIS | IS | ROW | 14 | | | FIELD | LAYOUT | 3 | |

| $c_{21}$ | $c_{22}$ | $c_{23}$ | $c_{24}$ | $c_{25}$ | $c_{26}$ | $c_{27}$ | $c_{28}$ | $c_{29}$ | $c_{210}$ |
|---|---|---|---|---|---|---|---|---|---|
| THIS IS | | | ROW 1 | | | | FIELD LAYOUT 1 | | |
| THIS | IS | ROW | 2 | | | FIELD | LAYOUT | 2 | |
| THIS | IS | ROW | 3 | | | FIELD | LAYOUT | 3 | |
| THIS | IS | ROW | 4 | | | FIELD | LAYOUT | 2 | |
| THIS IS | | | ROW 5 | | | | FIELD LAYOUT 1 | | |
| THIS | IS | ROW | 6 | | | FIELD | LAYOUT | 3 | |
| THIS | IS | ROW | 7 | | | FIELD | LAYOUT | 3 | |
| THIS | IS | ROW | 8 | | | FIELD | LAYOUT | 2 | |
| THIS IS | | | ROW 9 | | | | FIELD LAYOUT 1 | | |
| THIS IS | | | ROW 10 | | | | FIELD LAYOUT 1 | | |
| THIS | IS | ROW | 11 | | | FIELD | LAYOUT | 3 | |
| THIS | IS | ROW | 12 | | | FIELD | LAYOUT | 2 | |
| THIS | IS | ROW | 13 | | | FIELD | LAYOUT | 3 | |
| THIS | IS | ROW | 14 | | | FIELD | LAYOUT | 3 | |

FIGURE 2E

| $c_{21}$ | $c_{22}$ | $c_{23}$ | $c_{24}$ | $c_{25}$ | $c_{26}$ | $c_{27}$ | $c_{28}$ | $c_{29}$ | $c_{210}$ |
|---|---|---|---|---|---|---|---|---|---|
| THIS IS | | | ROW 1 | | | | FIELD LAYOUT 1 | | |
| THIS | IS | ROW | 2 | | | FIELD | LAYOUT | 2 | |
| THIS | IS | ROW | 3 | | | FIELD | LAYOUT | 3 | |
| THIS | IS | ROW | 4 | | | FIELD | LAYOUT | 2 | |
| THIS IS | | | ROW 5 | | | | FIELD LAYOUT 1 | | |
| THIS | IS | ROW | 6 | | | FIELD | LAYOUT | 3 | |
| THIS | IS | ROW | 7 | | | FIELD | LAYOUT | 3 | |
| THIS | IS | ROW | 8 | | | FIELD | LAYOUT | 2 | |
| THIS IS | | | ROW 9 | | | | FIELD LAYOUT 1 | | |
| THIS IS | | | ROW 10 | | | | FIELD LAYOUT 1 | | |
| THIS | IS | ROW | 11 | | | FIELD | LAYOUT | 3 | |
| THIS | IS | ROW | 12 | | | FIELD | LAYOUT | 2 | |
| THIS | IS | ROW | 13 | | | FIELD | LAYOUT | 3 | |
| THIS | IS | ROW | 14 | | | FIELD | LAYOUT | 3 | |

FIGURE 2F

| $c_{21}$ | $c_{22}$ | $c_{23}$ | $c_{24}$ | $c_{25}$ | $c_{26}$ | $c_{27}$ | $c_{28}$ | $c_{29}$ | $c_{210}$ |
|---|---|---|---|---|---|---|---|---|---|
| THIS IS | | | ROW 1 | | | | FIELD LAYOUT 1 | | |
| THIS | IS | ROW | 2 | | | FIELD | LAYOUT | 2 | |
| THIS | IS | ROW | 3 | | | FIELD | LAYOUT | 3 | |
| THIS | IS | ROW | 4 | | | FIELD | LAYOUT | 2 | |
| THIS IS | | | ROW 5 | | | | FIELD LAYOUT 1 | | |

| $c_{21}$ | $c_{22}$ | $c_{23}$ | $c_{24}$ | $c_{25}$ | $c_{26}$ | $c_{27}$ | $c_{28}$ | $c_{29}$ | $c_{210}$ |
|---|---|---|---|---|---|---|---|---|---|
| THIS | IS | ROW | 8 | | | FIELD | LAYOUT | 2 | |
| THIS IS | | | ROW 9 | | | | FIELD LAYOUT 1 | | |
| THIS IS | | | ROW 10 | | | | FIELD LAYOUT 1 | | |
| THIS | IS | ROW | 11 | | | FIELD | LAYOUT | 3 | |
| THIS | IS | ROW | 12 | | | FIELD | LAYOUT | 2 | |
| THIS | IS | ROW | 13 | | | FIELD | LAYOUT | 3 | |
| THIS | IS | ROW | 14 | | | FIELD | LAYOUT | 3 | |

COMPUTER PROGRAM PRODUCT FOR DISPLAYING MULTIPLE ROW LAYOUTS IN A TABLE

BACKGROUND

The present invention relates to displaying data, and more particularly, this invention relates to displaying data as a table in an easily readable manner.

Data sets may store many different types of data as rows of data. For example, a data set may be used by a business to store customer information with information for one customer in each row. If the business has multiple types of customers, these rows may include differing sets of data types depending on the type of customer a row is representing. When modifying such a data set, it is useful to be able to view all of the different data row types simultaneously.

SUMMARY

In one general embodiment, a computer program product comprising a computer useable medium includes a computer readable program, wherein the computer readable program when executed on a computer causes the computer to display a data set as a table including a plurality of cells. Additionally, the computer readable program when executed on a computer causes the computer to assign a column width to each cell in a row of the table, independently of other table rows having differing layouts, such that the table is capable of displaying a plurality of different row layouts simultaneously. Still yet, the computer readable program when executed on a computer causes the computer to display a dynamic header configured to display a row layout of a selected row of the table. Further, the computer readable program when executed on a computer causes the computer to increase a readability of the dynamic header with respect to the selected row by shrinking at least some rows which are located above the selected row and have a different row layout than the selected row, dimming at least some rows which are located above the selected row and have a different row layout than the selected row, and shifting column headers of the dynamic header to a position in the table directly above an associated column field in the selected row.

Other aspects, advantages and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWING

FIG. 2A shows a table for displaying multiple row layouts, in accordance with one embodiment.

FIG. 2B shows a table for displaying multiple row layouts, in accordance with another embodiment.

FIG. 2C shows a table for displaying multiple row layouts, in accordance with another embodiment.

FIG. 2D shows a table for displaying multiple row layouts, in accordance with another embodiment.

FIG. 2E shows a table for displaying multiple row layouts, in accordance with another embodiment.

FIG. 2F shows a table for displaying multiple row layouts, in accordance with another embodiment.

DETAILED DESCRIPTION

Figure 1:
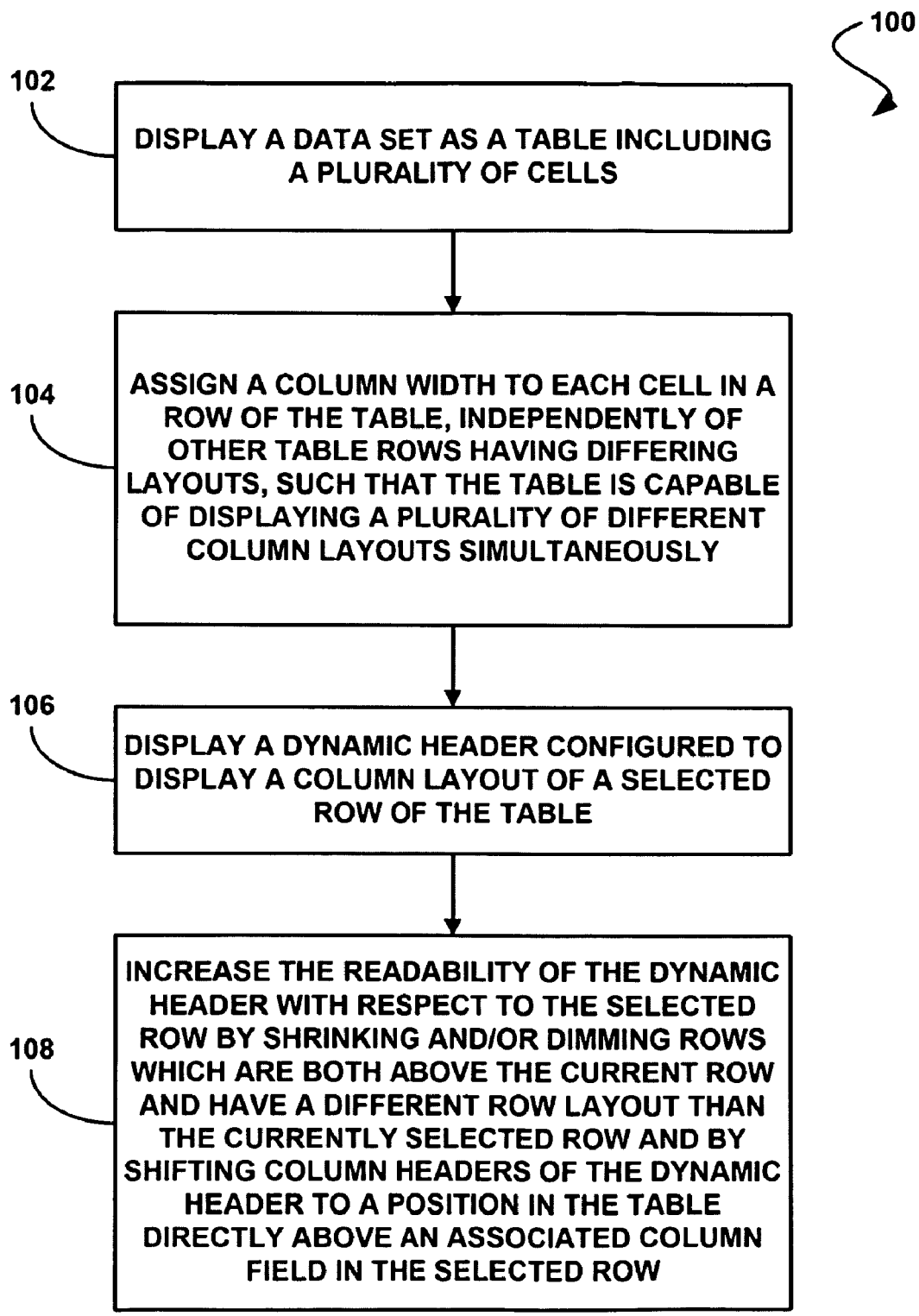
FIG. 1 shows a method for displaying multiple row layouts in a table, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a computer program product comprising a computer useable medium includes a computer readable program, wherein the computer readable program when executed on a computer causes the computer to display a data set as a table including a plurality of cells. Additionally, the computer readable program when executed on a computer causes the computer to assign a column width to each cell in a row of the table, independently of other table rows having differing layouts, such that the table is capable of displaying a plurality of different row layouts simultaneously. Still yet, the computer readable program when executed on a computer causes the computer to display a dynamic header configured to display a row layout of a selected row of the table. Further, the computer readable program when executed on a computer causes the computer to increase a readability of the dynamic header with respect to the selected row by shrinking at least some rows which are located above the selected row and have a different row layout than the selected row, dimming at least some rows which are located above the selected row and have a different row layout than the selected row, and shifting column headers of the dynamic header to a position in the table directly above an associated column field in the selected row.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 1 shows a method 100 for displaying multiple row layouts in a table, in accordance with one embodiment. As shown, a data set is displayed as a table including a plurality of cells. See operation 102. In the context of the present description, a data set refers to any data capable of being displayed in a table.

Furthermore, a column width is assigned to each cell in a row of the table, independently of other table rows having differing layouts, such that the table is capable of displaying a plurality of different row layouts simultaneously. See operation 104. Additionally, a dynamic header configured to display a row layout of a selected row of the table is displayed. See operation 106.

In this case, a row layout refers to a description of the appearance of one or more rows in a data set, which may specify information such as the number of columns in the row, widths of those columns, etc. Further, in the context of the present description, a dynamic header refers to any table header whose row layout may be automatically be configured to reflect a row layout of a selected row. As shown further in FIG. 1, the readability of the dynamic header with respect to the selected row is increased by shrinking at least some rows which are located above the selected row and have a different row layout than the selected row, dimming at least some rows which are located above the selected row and have a different row layout than the selected row, and shifting applicable column headers of the dynamic header to a position in the table directly above an associated column field in the selected row. See operation 108.

In some cases, data sets may store data in several different formats. For example, a data set may be used by a business to store customer information with one customer's information in each row. If the business has multiple types of customers, these rows may include different sets of data types depending on the type of customer they are representing. One customer type, A, may have three pieces of data, or fields, that need to be stored. Another customer type, B, may have ten fields and none in common with type A.

When modifying such a data set, it is useful to be able to view all of the contents at once. It is also useful to be able to open the data set in a field-formatted display. A field-formatted display splits each row into a set of fields, each of which having a distinct name and type. The field-formatted display application may then display all of the data, no matter the underlying representation in memory, for a user in an easily readable manner. In one embodiment, such data may be displayed in a table where each record is displayed as a table row. Thus, each row's set of columns may include the record's set of fields. In this case, the set of fields within a row is referred to as the row layout. Additionally, the terms "field" and "column" may be used interchangeably.

For the above example, the row layout for customer type A may be represented by $\{C_{A1}, C_{A2}, C_{A3}\}$, where $C_{A1}, C_{A2}, C_{A3}$ represents the columns/fields stored in the row. The row layout for customer type B may be represented by $\{C_{B1}, C_{B2}, C_{B3}, C_{B4}, C_{B5}, C_{B6}, C_{B7}, C_{B8}, C_{B9}, C_{B10}\}$.

Using a graphical user interface (GUI) in table form, a user may be provided with an intuitive view of all of the data at once, regardless of the number of row layouts present in a table such that rows of any row layout may be quickly read and modified. In one embodiment, a table may be presented including a dynamic header that changes depending on which row layout is being accessed in the current row selection. Additionally, the table may allow columns to be aligned such that columns $c_{ni}$ with equal i need not have the same column width. This allows all layouts to be drawn within the table in a space-efficient manner.

As an option, at least one clutter reduction mechanism may also be provided to make it easier to associate the table header's columns with the columns of the currently selected row. In this case, the clutter includes the rows above the currently selected row that are of different row layouts.

The dynamic header, and the clutter reduction mechanism may be utilized to display rows including different sets of fields (e.g. different column widths) in a single table that is easy for users to read and edit. In this way, a user may have quick access to all rows of the table at once, with no hiding of data. This may allow the user to view the data set and of all of the underlying data simultaneously, instead of only having the ability to view one row layout in the data set clearly. In this way, the table will not force the columns to be the same width in all row layouts.

For instance, in the above example, the column for $c_{B1}$ should not have to be the same width as the column for $c_{A1}$ since $c_{A1}$ has a different row layout with many more columns per row. Furthermore, the dynamic table header may be configured dynamically FIG. 2A shows how a table is rendered when a row is selected, in accordance with one embodiment. As shown, it may be easily determined which fields are which in a selected row 202 based on the dynamic column header 204. In this case, the selected row 202 is the first row in the table and includes a row layout with three fields. Thus, the dynamic header 204 is automatically configured to match the field layout of the selected row 202 upon selection of the row.

FIG. 2B shows the table of FIG. 2A where the selected row 202 is the eighth row. As shown, the dynamic table header 204 has automatically changed to match the currently selected row 202. As an option, the clutter, or the rows above the selected row 202 not having the same field layout, may be reduced. The clutter may be reduced in several ways.

In one embodiment, the rows above the selected row 202 that are not of the currently selected row layout may be shrunk or otherwise minimized, as shown in FIG. 2C. This greatly reduces the clutter above while still giving a viewer an easy way to select a row of another row layout. In addition to reducing the clutter above, the currently selected row 202 may also be moved closer to the dynamic header 204 because of the fact that at least some rows above have been shrunk.

In another embodiment, the rows above the currently selected row 202 that are not of the currently selected row layout may be dimmed, their color dulled, or otherwise distinguished by color, as shown in FIG. 2D. This greatly reduces clutter row layout and makes the currently selected row much more readable.

In yet another embodiment, the rows above the selected row 202 that are not of the currently selected row layout may be shrunk and dimmed, as shown in FIG. 2E. In this case, a user may easily view and edit the currently selected row 202.

In still another embodiment, the dynamic table header 204 may be allowed to "float" down to the currently selected row 202 and rest directly above the currently selected row 202, as shown in FIG. 2F. In this case, the original dynamic table header 204 may be positioned directly above the currently selected row 202 and simultaneously be displayed at the top of the table. This may be implemented with multiple headers, for example. As an option, the floating header 204 may simply cover the row above the currently selected row 202. As another option, hover-text may be utilized as the floating header 204. In one embodiment, any operations to be accessed by clicking on the dynamic header 204 may be taken on the actual header at the top of the table.

It should be noted that any of the aforementioned clutter reduction techniques may be implemented individually or in any combination thereof. In either case, when any of the above techniques and a dynamic table header are employed in a table containing rows of multiple row layouts, the result is a table capable of displaying all of the row layouts at once in a manner that is still easily readable and editable by a user.

It should be noted that, the invention can take the form of an embodiment containing both hardware and software elements. In one embodiment, the invention may be implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product comprising a computer useable medium including a computer readable program, wherein the computer readable program when executed on a computer causes the computer to:
    display a data set as a table including a plurality of cells;
    assign a column width to each cell in a row of the table, independently of other table rows having differing layouts, such that the table is capable of displaying a plurality of different row layouts simultaneously;
    display a dynamic header configured to display a row layout of a selected row of the table;
    increase a readability of the dynamic header with respect to the selected row by shrinking at least some rows which are located above the selected row and have a different row layout than the selected row, dimming at least some rows which are located above the selected row and have a different row layout than the selected row, and shifting column headers of the dynamic header to a position in the table directly above an associated column field in the selected row.

* * * * *